United States Patent
Payne et al.

(10) Patent No.: US 10,788,590 B1
(45) Date of Patent: Sep. 29, 2020

(54) SYSTEMS AND METHODS FOR AUGMENTING A SATELLITE BASED NAVIGATION SYSTEM WITH ALTERNATIVE POSITION AND TIMING DATA

(71) Applicant: National Technology & Engineering Solutions of Sandia, LLC, Albuquerque, NM (US)

(72) Inventors: Jason A. Payne, Albuquerque, NM (US); John J. Mason, Albuquerque, NM (US); Albert Hummel, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 288 days.

(21) Appl. No.: 15/975,082

(22) Filed: May 9, 2018

(51) Int. Cl.
| | |
|---|---|
| *G01S 1/24* | (2006.01) |
| *G01S 19/48* | (2010.01) |
| *G01S 19/36* | (2010.01) |
| *G01S 5/14* | (2006.01) |

(52) U.S. Cl.
CPC ........... *G01S 19/48* (2013.01); *G01S 1/24* (2013.01); *G01S 5/14* (2013.01); *G01S 19/36* (2013.01)

(58) Field of Classification Search
CPC .......... G01S 19/48; G01S 19/41; G01S 19/07; G01S 19/44; G01S 19/36; G01S 1/24; G01S 5/14; G01S 5/0027

USPC ..................................................... 342/357.31
See application file for complete search history.

(56) References Cited

U.S. PATENT DOCUMENTS

| | | | | |
|---|---|---|---|---|
| 5,563,611 A | * | 10/1996 | McGann | G01S 1/24 342/352 |
| 2009/0251365 A1 | * | 10/2009 | Suzuki | G01S 19/074 342/357.24 |

OTHER PUBLICATIONS

Skydel, "Sky-High Performance, Unmatched Flexibility", Retrieved at: <<https://www.skydelsolutions.com/en/products/sdx/>>, Retrieved Date: Apr. 6, 2018, 4 pages.

(Continued)

*Primary Examiner* — Harry K Liu
(74) *Attorney, Agent, or Firm* — Madelynne J. Farber; Mark A. Dodd

(57) ABSTRACT

Various technologies pertaining to integrating a positioning or timing solution from an alternative position, navigation, or timing (PNT) system into a satellite-based-navigation system are described herein. The PNT system generates a position/timing (P/T) solution that indicates a current position or current time of the PNT system. The P/T solution is provided as input to a simulation of a satellite constellation of the satellite-based-navigation system, and a constellation signal is generated based on the simulation and the P/T solution. The constellation signal is formatted according to a navigation signal format of the satellite-based-navigation system such that when the constellation signal is provided to a receiver of the satellite-based-navigation system, the receiver computes a P/T solution that indicates the current position or the current time identified by the PNT system.

20 Claims, 6 Drawing Sheets

(56) References Cited

OTHER PUBLICATIONS

Spectracom, "GSG Series GPS/GNSS Simulators", Retrieved at: <<https://spectracom.com/products-services/gnss-simulation/gpsgnss-simulators>>, Retrieved Date: Apr. 6, 2018, 6 pages.
Spirent, "GSS6700 Multi-GNSS Constellation Simulator", Retrieved at: <<htttps://www.spirent.com/Products/GSS6700>>, Retrieved Date: Apr. 6, 2018, 4 pages.

* cited by examiner

SYSTEMS AND METHODS FOR AUGMENTING A SATELLITE BASED NAVIGATION SYSTEM WITH ALTERNATIVE POSITION AND TIMING DATA

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Global positioning systems (GPS) are employed nearly ubiquitously in connection with providing a wide variety of services and functions in a range of different environments. In various examples, GPS is used in connection with civilian maritime navigation, GPS-guided weaponry, battlefield navigation, smartphone-based mobile applications, etc. GPS receivers are relatively inexpensive, simple to use, and provide positioning resolution fine enough for most positioning and navigation needs.

While GPS enhances the utility of various systems, or fundamentally enables certain others, any system that relies on GPS for positioning, navigation or timing may be vulnerable to interference at the receiver, or to failure of the GPS system itself. For example, in a battlefield environment, GPS signals may be jammed in order to disrupt GPS-based navigation and other military applications. In another example, a functionality of the GPS satellite constellation may be degraded, or the GPS constellation may be partially disabled by intentional, unintentional or natural means (e.g., solar flares). The failure of GPS for use in connection with navigation or timing can in turn cripple critical systems in both military and civilian environments.

Several alternative positioning, navigation, and/or timing (PNT) systems to GPS exist. Conventionally, however, a GPS receiver is only configured to determine its position or the current time based on GPS signals. Hence, in order to make use of an alternative PNT system, separate hardware must be employed. In some systems, a GPS-based receiver is tightly integrated with other aspects of the system. In such cases, integration of the hardware of an alternative PNT system with other components of the larger system may be difficult or impossible. In other systems, use of an alternative PNT system conventionally requires separate user interfaces, whereas it may be undesirable for a user to be required to shift her view from one interface to another (e.g., in a live navigation activity).

SUMMARY

The following is a brief summary of subject matter that is described in greater detail herein. This summary is not intended to be limiting as to the scope of the claims.

Various technologies pertaining to integrating a positioning and/or timing (P/T) solution from an alternative PNT system into a GPS-based system are described herein. The technologies described herein allow position or timing data from a non-GPS PNT system to be provided to a GPS-based system such that the GPS-based system functions as if it had received a GPS signal indicating the position or time indicated in the non-GPS PNT data. Hence, the technologies described herein facilitate integration of non-GPS PNT data into integrated GPS-based systems without requiring hardware modification of the larger system. Furthermore, the technologies described herein enable non-GPS PNT data to be presented to a user in the same interface as GPS data so that a user does not need to switch his focus from one interface to another.

In various embodiments, a GPS receiver, a non-GPS PNT system, and a computing device are collocated on the same platform. In ordinary operation, the GPS receiver outputs data indicative of a position of the GPS receiver (e.g., latitude/longitude coordinates and altitude) and/or a current time. At some point during the ordinary operation, a GPS signal being received by the GPS receiver may be interrupted, interfered with, or otherwise prevented from being received at the GPS receiver. Responsive to determining that an output of the GPS receiver is unreliable (e.g., due to interference or interruption of the GPS signal being received by the GPS receiver), P/T data from the non-GPS PNT system can be provided to the GPS receiver. The PNT system outputs a P/T solution to the computing device, where the P/T solution indicates at least one of a position of the PNT system or a current time. The computing device executes a GPS constellation simulator based on the P/T solution received from the PNT system. The GPS constellation simulator generates a GPS constellation signal based on the P/T solution. The GPS constellation signal is configured such that when a GPS receiver receives the GPS constellation signal, the GPS receiver interprets the GPS constellation signal as indicating the position of the PNT system and/or the current time indicated in the P/T solution output by the PNT system. In other words, the GPS receiver interprets receipt of the GPS constellation signal as being equivalent to the GPS receiver receiving a genuine GPS signal at the same location and/or time as indicated in the P/T solution generated by the PNT system. For example, the GPS constellation signal comprises a plurality of simulated GPS signals, where each of the simulated GPS signals is a simulated output of a respective GPS satellite.

Subsequent to generating the GPS constellation signal, the computing device causes the GPS constellation signal to be output to the GPS receiver. In one exemplary embodiment, the GPS receiver and the computing device are connected by a wired communications link, and the computing device outputs the GPS constellation signal to the GPS receiver by way of the wired communications link. For example, the computing device can output the GPS constellation signal to a primary RF input port of the GPS receiver, subsequent to disconnecting a GPS antenna from the primary RF input port of the GPS receiver. In another exemplary embodiment, the GPS receiver comprises an integrated GPS antenna. In this embodiment, the computing device outputs the GPS constellation signal by way of a second antenna, where the GPS receiver receives the GPS constellation signal by way of the integrated GPS antenna.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
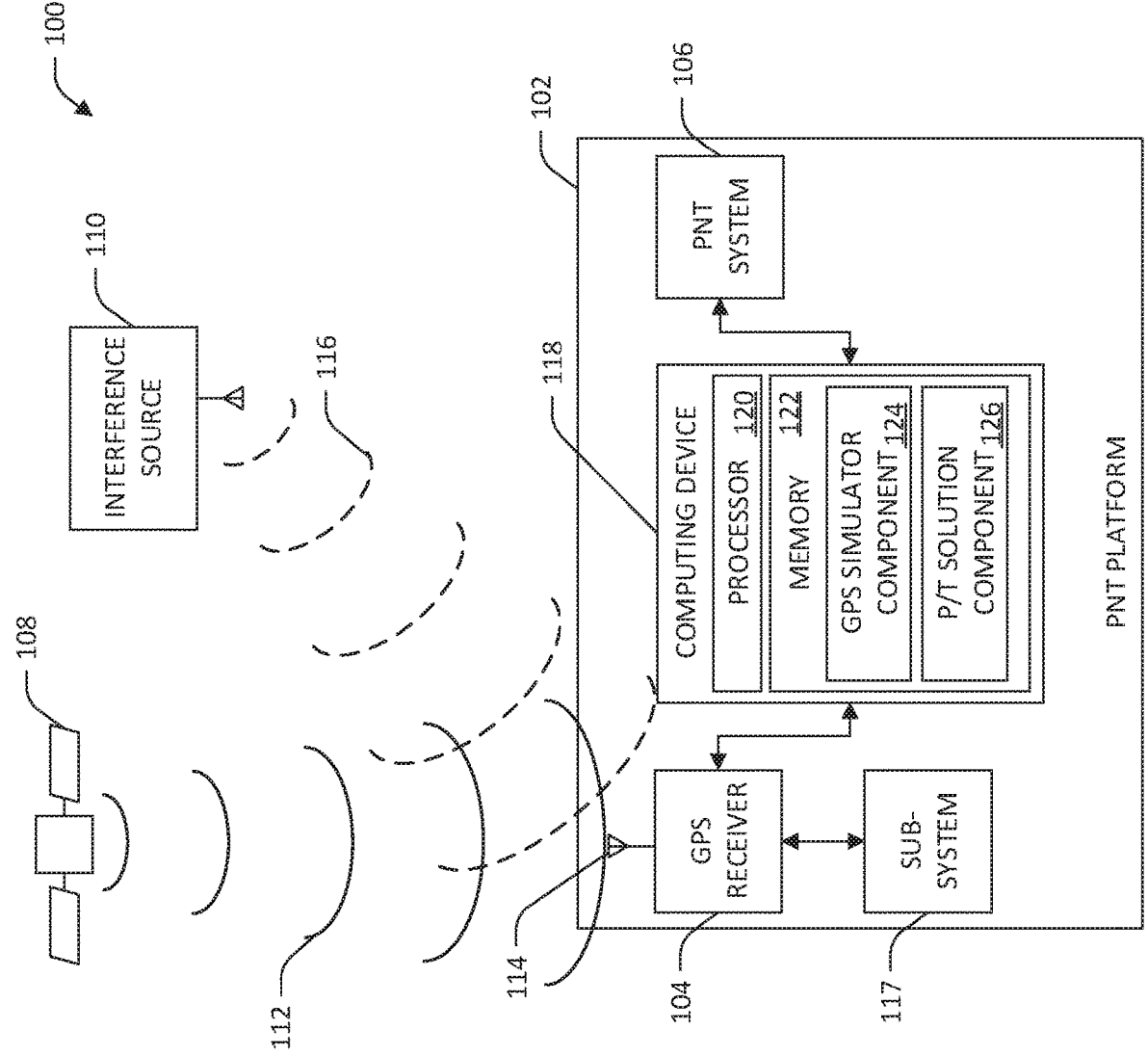
FIG. 1 is a functional block diagram of an exemplary operational environment for a system that facilitates integration of position and/or timing data from an alternative PNT system with a GPS-based PNT system.

Various technologies pertaining to presenting alternative positioning, navigation, timing (PNT) data in an existing GPS interface are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference. Furthermore, it is to be understood that while various concepts are described herein with respect to the Global Positioning System (GPS), such concepts are applicable to substantially any satellite-based navigation system, including, but not limited to, the Global Navigation Satellite System (GLONASS), the BeiDou Navigation Satellite System (BDS), the Galileo positioning system, etc. Hence, where reference is made herein to GPS, it is to be understood that any alternative satellite-based navigation system may be used instead.

With reference now to FIG. 1, an exemplary operational environment 100 for a PNT platform 102 that includes a GPS receiver 104 and a non-GPS PNT system 106 is illustrated. The operational environment includes the PNT platform 102, a constellation of GPS satellites 108, and an interference source 110. The PNT platform 102 can be substantially any device, system, or object that incorporates a GPS receiver. In exemplary embodiments the PNT platform 102 may be a ship, an aircraft or other vehicle, a building or other fixed facility (e.g., that uses GPS for precise timing), a mobile computing device, etc. In the operational environment 100, the GPS receiver 104 receives a GPS signal 112 by way of a GPS antenna 114, the GPS signal 112 comprising signals emitted by a plurality of satellites in the GPS constellation 108. In ordinary operation, the GPS receiver 104 receives the GPS signal 112 and computes a P/T solution based on the GPS signal 112. The P/T solution comprises at least one of a position solution and a timing solution, wherein the position solution comprises a three-dimensional position of the GPS receiver 104 (e.g., latitude, longitude, and altitude) and the timing solution comprises a current time.

In the exemplary environment 100, the GPS receiver 104 also receives, by way of the GPS antenna 114, an interfering signal 116 that is output by the interference source 110. The interference source 110 may be unintentional radio interference or employed intentionally to disrupt the ordinary operation of the GPS receiver 104. Thus, the interference signal 116 may be configured to interfere with the GPS signal 112 such that a signal received at the GPS antenna 114 (e.g., some interference combination of the GPS signal 112 and the interference signal 116) is unable to be used by the GPS receiver 104 to compute the P/T solution.

Whereas the GPS receiver 104 may be unable to compute a P/T solution in the presence of the interference signal 116, the PNT system 106 may be unaffected by the interference signal 116. The PNT system 106 outputs a P/T solution comprising data indicative of at least one of a position of the PNT system 106 or a current time. The PNT system 106 is a non-GPS system that does not rely on the GPS signal 112 from the GPS constellation 108 in order to function. The PNT system 106 can be or include any of various systems that provide positioning or timing data. In an embodiment, the PNT system 106 can be a receiver configured to function in conjunction with a satellite-based navigation system other than the system used by the GPS receiver 104. In other embodiments, the PNT system 106 can be or include a hyperbolic navigation/multilateration system such as a LORAN/LORAN-C receiver, a clock device (e.g., an atomic clock), a triangulation positioning system, a trilateration positioning system etc.

Figure 2:
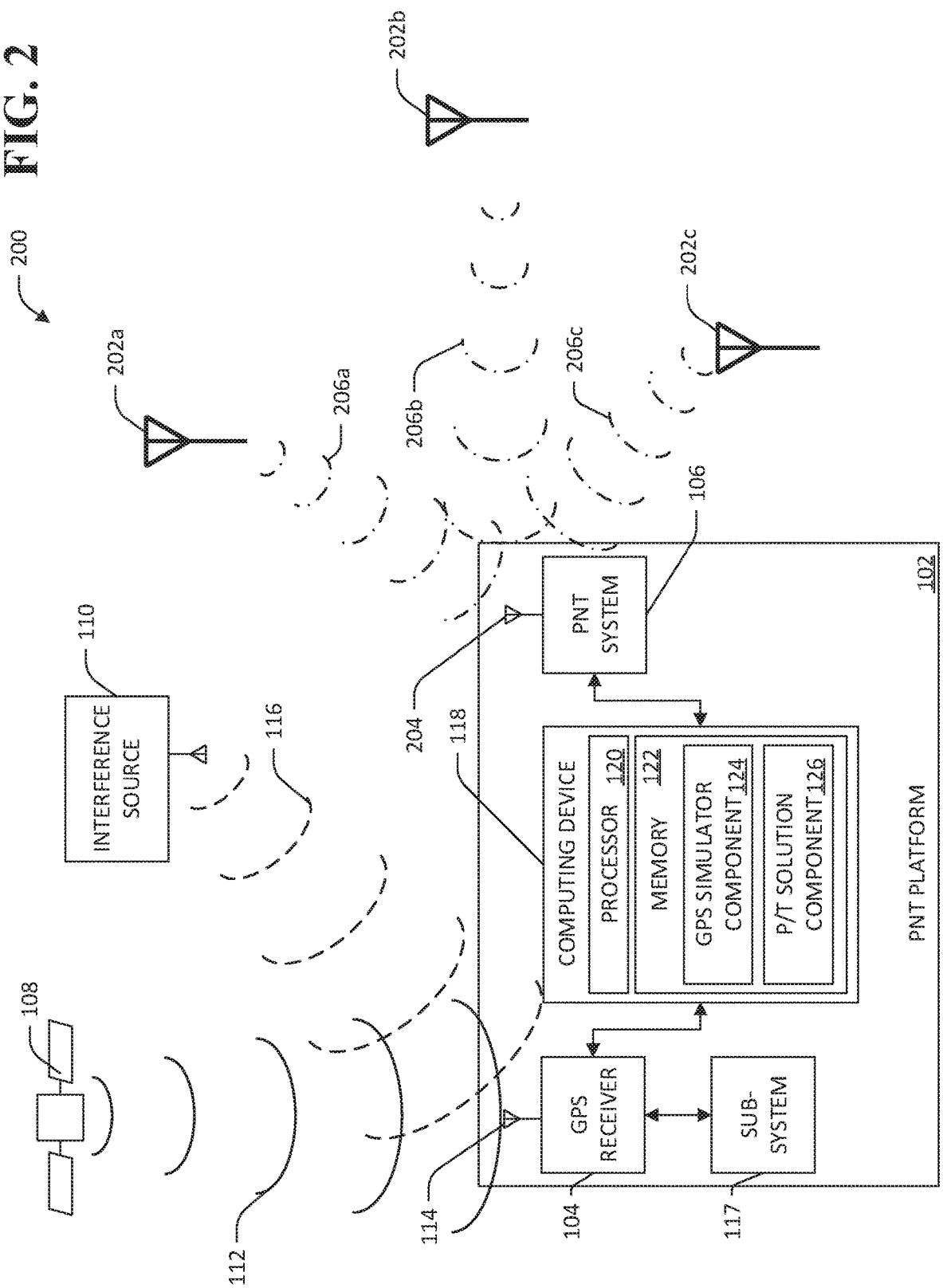
FIG. 2 is a functional block diagram of another exemplary operational environment for a system that facilitates integration of position and/or timing data from an alternative PNT system with a GPS-based PNT system.

By way of example, and not limitation, and referring now to FIG. 2, an operational environment 200 of the PNT platform 102 is illustrated wherein the PNT system 106 computes a P/T solution based upon signals received from a plurality of transmitting stations 202a-202c. In the exemplary operational environment 200, the PNT system 106 comprises a receiver antenna 204 that receives signals 206a-206c from the plurality of transmitters 202a-202c, respectively. In the exemplary operational environment 200, the PNT system 106 computes a P/T solution based upon the signals 206a-206c. By way of an example, the transmitters 202a-202c can be synchronized ground stations, and the PNT system 106 can be configured to compute the P/T solution based upon time difference of arrival (TDOA) of the three signals 206*a*-206*c* (e.g., as in the LORAN system). While some exemplary types of PNT systems are described herein to facilitate understanding of certain concepts, it is to be understood that the PNT system 106 can be substantially any system that outputs data indicative of a current time and/or a position of the PNT system 106.

While it may be ascertained that the non-GPS PNT system 106 may serve a similar function to the GPS receiver 104 in that the PNT system 106 outputs a P/T solution, use of the PNT system 106 on its own for redundancy with respect to P/T data may be difficult or undesirable. For example, the PNT platform 102 may comprise a sub-system 117 that is integrated with the GPS receiver 104 (e.g., installed on a same printed circuit board, forming part of a same integrated circuit, etc.) and that relies on receipt of data from the GPS receiver 104 to function. An existing printed circuit board or integrated circuit may be difficult to modify to incorporate the alternative PNT system 106. Furthermore, it may be impossible to modify a design of an integrated circuit to incorporate the PNT system 106 while maintaining other necessary performance characteristics (e.g., size, weight, and power). In another example, where the PNT platform 102 is an aircraft, the sub-system 117 can be a heads-up display (HUD) that displays latitude, longitude, and altitude of the aircraft based upon the P/T data output by the GPS receiver 104. It may be undesirable for a pilot of the aircraft to be required to direct his attention away from the HUD and to a separate PNT system display.

Accordingly, the PNT platform 102 further comprises a computing device 118 that receives, from the PNT system 106, data indicative of the P/T solution computed by the PNT system 106. The computing device 118 then outputs a GPS constellation signal to the GPS receiver 104, where the GPS constellation signal is configured to cause the GPS receiver 104 to output data indicative of the position and/or current time indicated in the P/T solution computed by the PNT system 106. For example, the GPS constellation signal can be configured to conform to a navigation signal format for signals output by GPS satellites in the GPS constellation 108. Hence, the GPS constellation signal causes the GPS receiver 104 to act substantially as if it had received the GPS signal 112 without interference of the interference signal 116 at the position and time indicated in the P/T solution computed by the PNT system 106. It is to be understood that the P/T solution computed by the PNT system 106 may be less accurate than the P/T solution that would be computed by the GPS receiver 104 in its ordinary operation.

Operations of the computing device 118 in connection with outputting the GPS constellation signal to the GPS receiver 104 are now described in greater detail. The computing device 118 comprises a processor 120 and memory 122 that is operably coupled to the processor 120. The memory 122 comprises a GPS simulator component 124 that, when executed by the processor 120, causes the processor 120 to compute the GPS constellation signal. The GPS constellation signal can comprise a plurality of simulated GPS signals, wherein each of the simulated GPS signals is representative of an output of a respective satellite in the GPS constellation 108. When the GPS receiver 104 receives the GPS constellation signal output by the computing device 118, the GPS receiver 104 computes a P/T solution based on the simulated GPS signals. The simulated GPS signals can be computed by the GPS simulator component 124 based on a simulated state of satellites in the GPS constellation 108. In an exemplary embodiment, the GPS simulator component 124 is configured to execute a simulation of the GPS constellation 108 based upon an initialization state. The initialization state comprises data indicative of known positions of satellites in the GPS constellation 108 at a given time. In another exemplary embodiment, the GPS simulator component 124 receives data that is indicative of the GPS signal 112 from the GPS receiver 104 as long as the GPS receiver 104 is able to compute a P/T solution from the GPS signal 112 (e.g., when the GPS receiver 104 is not receiving the interference signal 116). The GPS simulator component 124 can then execute the simulation of the GPS constellation 108 based upon the most recently received GPS signal 112.

In an exemplary non-limiting embodiment, the GPS simulator component 124 maintains a simulated state (e.g., absolute three-dimensional positions, relative positions, simulated output signals, etc.) of a plurality of satellites in the GPS constellation 108. Responsive to receiving the P/T solution from the PNT system 106, the GPS simulator component 124 can identify satellites that would be in view of the GPS receiver 104 based upon the simulated state of the satellites of the GPS constellation 108. The GPS simulator component 124 can then further determine a simulated output signal for each of the satellites in view of the GPS receiver 104 based upon the simulated state of the satellites. The GPS simulator component 124 can then transmit the simulated output signals of the satellites in view of the GPS receiver 104 to the GPS receiver 104, e.g., as the GPS constellation signal.

The GPS receiver 104 receives the GPS constellation signal and computes a P/T solution based on the GPS constellation signal. The GPS receiver 104 need not be configured to distinguish between the GPS signal 112 transmitted by the GPS constellation 108 and the GPS constellation signal output by the computing device 118. The GPS constellation signal is configured to conform to a GPS navigation signal format such that the GPS receiver 104 computes a P/T solution based on the GPS constellation signal in the same fashion as the GPS receiver 104 would compute the P/T solution based on the GPS signal 112.

The computing device 118 can be configured to output the GPS constellation signal to the GPS receiver 104 in several different ways. In one embodiment, the computing device 118 outputs the GPS constellation signal to the GPS receiver 104 by way of a wired connection. By way of example, the GPS receiver 104 can include an input port intended as an input port for signals from an external GPS antenna. The computing device 118 can be communicatively coupled to the GPS receiver 104 by way of such input port.

Figure 3:
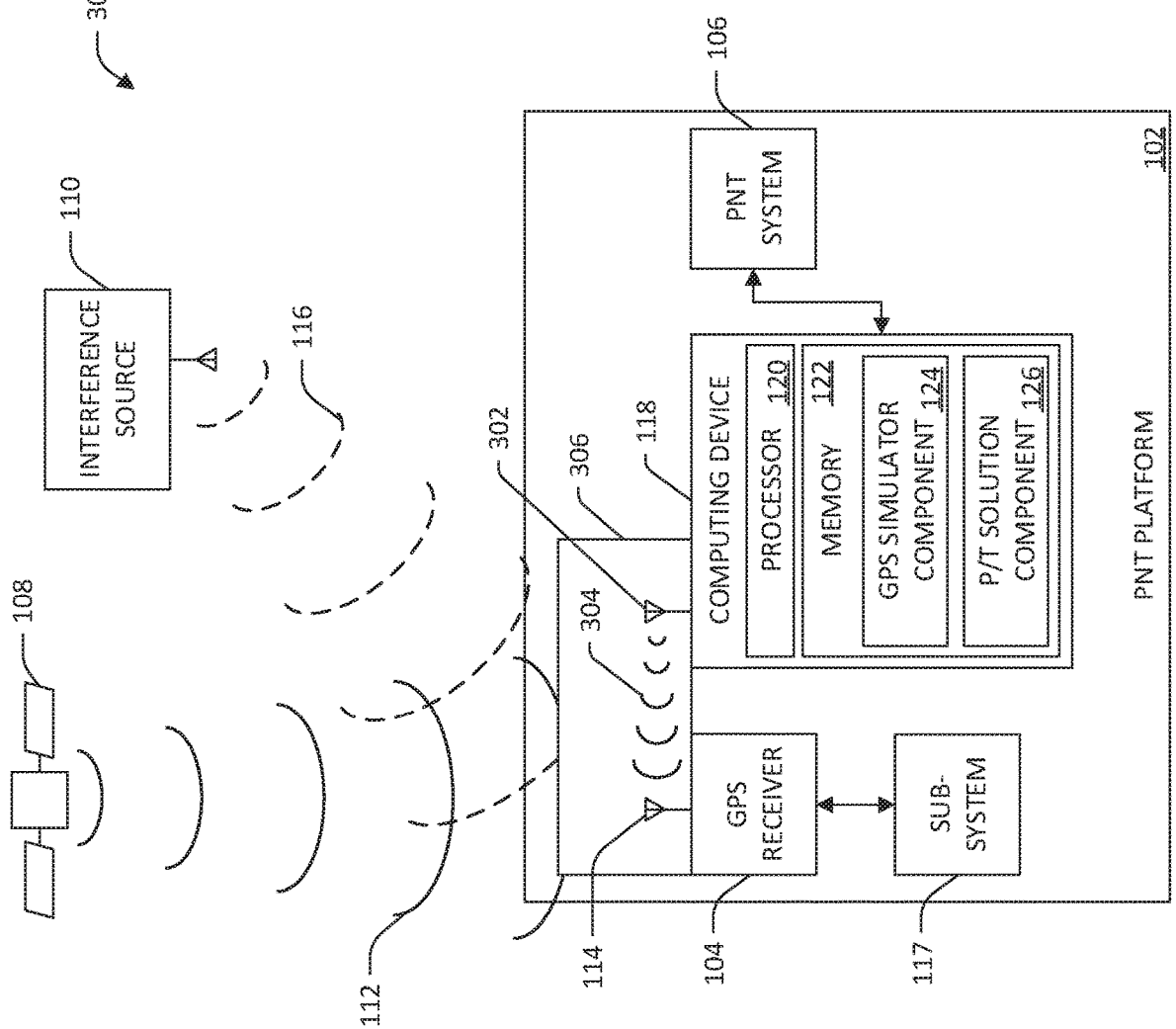
FIG. 3 is a functional block diagram of an embodiment wherein a GPS constellation signal is wirelessly transmitted to a GPS receiver.

In another embodiment, the computing device 118 is coupled to an antenna that transmits the GPS constellation signal to the GPS receiver wirelessly. For example, and referring now briefly to FIG. 3, another exemplary operational environment 300 is illustrated wherein the computing device 118 transmits the GPS constellation signal to the GPS receiver 104 by way of a wireless connection. In the exemplary environment 300, the computing device 118 is communicatively coupled to an antenna 302. The computing device 118 outputs the GPS constellation signal to the antenna 302, whereupon the antenna 302 transmits the GPS constellation signal as a wireless signal 304. In exemplary embodiments, the antenna 302 is configured to transmit the signal 304 according to a configuration of the GPS antenna 114. For example, the antenna 302 can be configured to transmit the signal 304 according to a frequency for which the GPS antenna 114 is tuned, an operational input power range of the GPS antenna 114, etc. In the exemplary environment 300, the PNT platform 102 can further include a shield 306 that can be engaged to shield the GPS antenna 114 and the antenna 302. The shield 306 can be engaged (e.g., manually by a user) when the interference signal 116 is detected, or when it is determined that the GPS receiver 104 is otherwise unable to compute a P/T solution based upon the GPS signal 112. The shield 306 can improve an ability of the GPS antenna 114 to receive the signal 304 without interference from the interference signal 116, which may also interfere with the signal 304.

The GPS simulator component 124 generates the GPS constellation signal based upon a P/T solution. In exemplary embodiments, the computing device 118 receives the P/T solution from the PNT system 106. In other exemplary embodiments, the computing device 118 receives data from the PNT system that can be used to compute a P/T solution. In such embodiments, the memory 122 further includes a P/T solution component 126 that can be configured to compute a P/T solution based upon data received at the computing device 118 from the PNT system 106.

Figure 4:
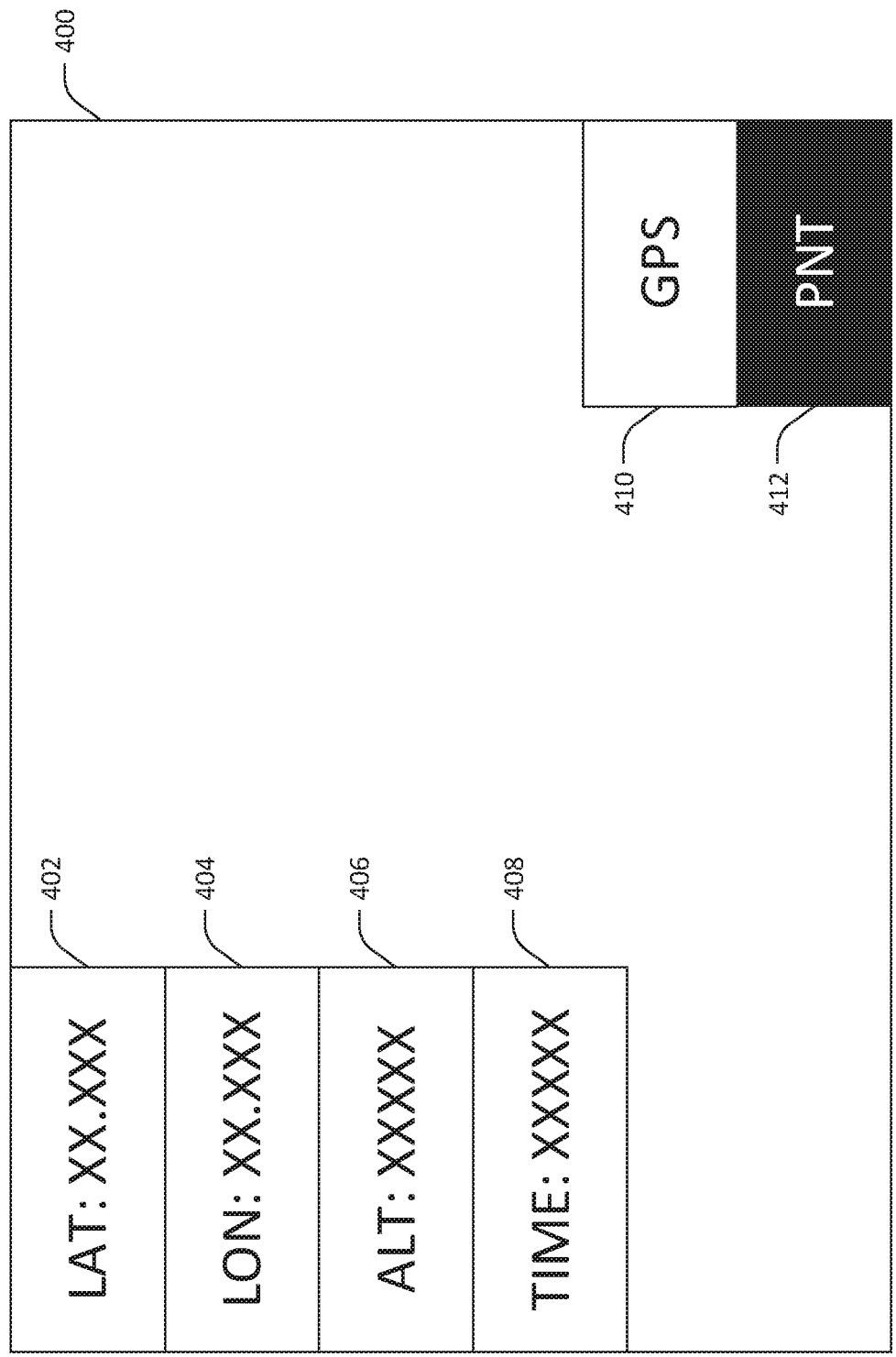
FIG. 4 illustrates an exemplary graphical user interface (GUI).

In exemplary embodiments, the GPS receiver 104 can include a display by way of which a position or current time identified in the P/T solution computed by the GPS receiver 104 can be displayed. A display of the GPS receiver 104 can be configured to display an indication as to whether the position and current time being displayed is computed by the GPS receiver 104 based upon the GPS signal 112 or the GPS constellation signal output by the computing device 118. Referring now to FIG. 4, an exemplary graphical user interface (GUI) 400 for a GPS receiver is shown. The GUI 400 comprises a latitude indicator 402, a longitude indicator 404, an altitude indicator 406, and a current time indicator 408, wherein the indicators 402-408 are displayed based upon a P/T solution computed by the GPS receiver 104. In some exemplary embodiments, the GUI 400 can further comprise a GPS indicator 410 and a PNT indicator 412. As depicted in the GUI 400, the PNT indicator 412 is depicted as being highlighted due to the GPS receiver 104 computing the P/T solution based on the GPS constellation signal output by the computing device 118. Thus, the GUI 400 indicates to a user that the position and current time indicated by the indicators 402-408 is based on a P/T solution computed by the PNT system 106. Upon re-establishing receipt of the GPS signal 112 without interference (e.g., from the interference signal 116), the GPS receiver 104 can cause the GUI 400 to highlight the GPS indicator 410 to indicate to a user that the position and time indicated by the indicators 402-408 are based upon the GPS signal 112 rather than the P/T solution computed by the PNT system 106.

Figure 5:
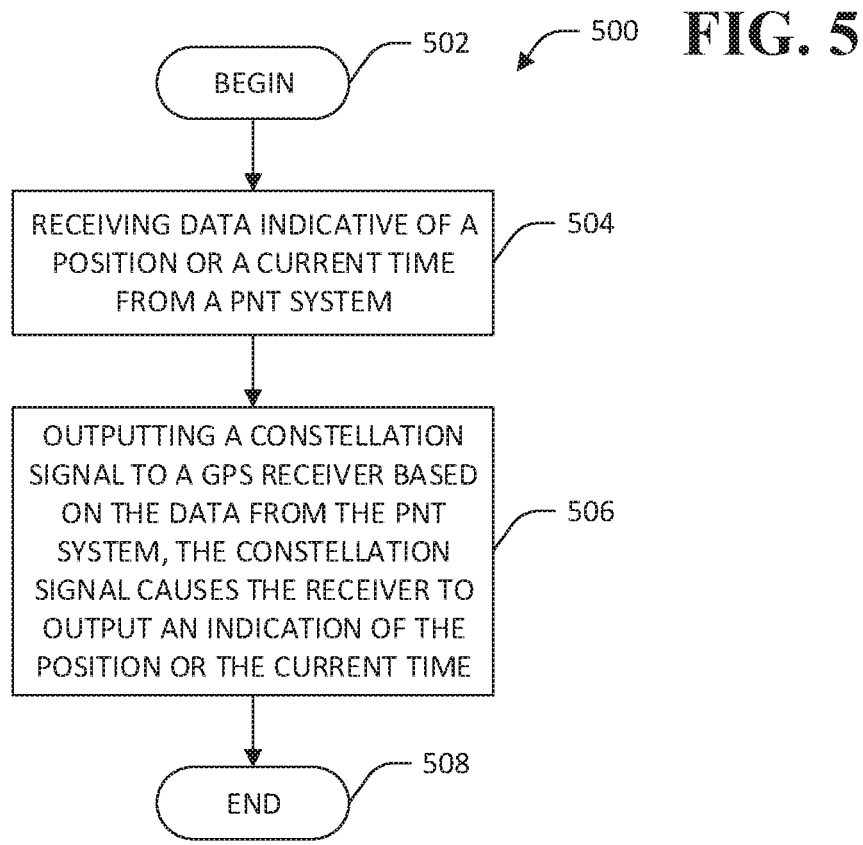
FIG. 5 is a flow diagram that illustrates an exemplary methodology for integrating position and/or timing data from an alternative PNT system with a satellite-based-navigation system.

FIG. 5 illustrates an exemplary methodology 500 relating to augmenting a GPS system with PNT data from a non-GPS PNT system. While the methodology is shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

The methodology 500 begins at 502, and at 504 data indicative of at least one of a position or a current time is received from a PNT system. As noted above, the PNT system can be substantially any system that outputs data indicative of the position of the PNT system or the current time. At 506, a constellation signal is output to a GPS receiver or other satellite-based-navigation receiver based upon the data received from the PNT system at 504. The constellation signal conforms to a navigation signal format of the satellite-based-navigation receiver and is configured to mimic signals that would be received by the receiver from, for example, the constellation of GPS satellites. By way of example, the constellation signal is configured to be substantially similar to a signal that would be received by the receiver from the satellite constellation if the receiver were at the position indicated in the data received from the PNT system at 504. Thus, responsive to receipt of the constellation signal, the receiver outputs an indication of at least one of the position or the current time indicated in the data received from the PNT system at 504. Upon outputting the constellation signal to the GPS receiver at 506, the methodology 500 completes 508.

Figure 6:
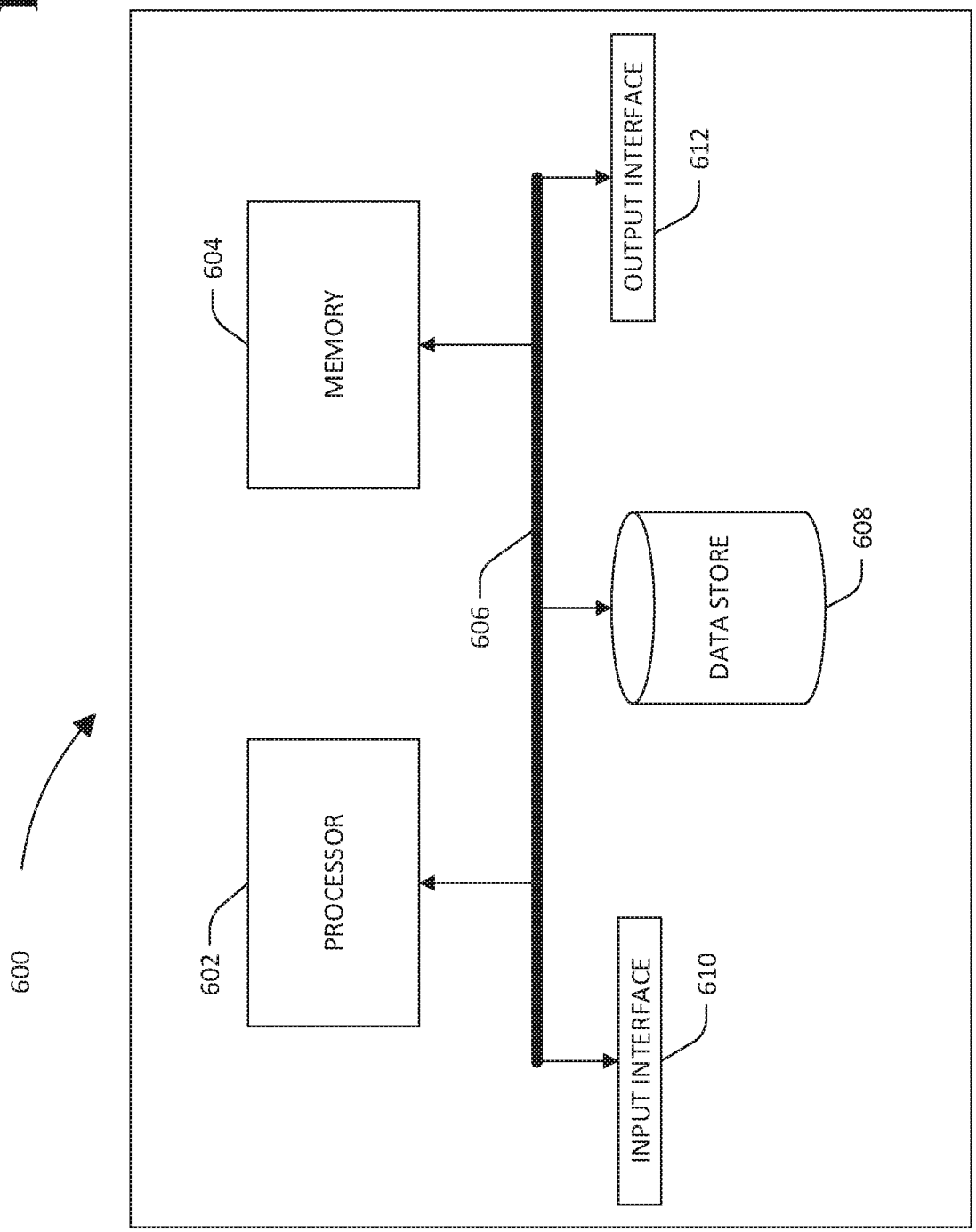
FIG. 6 is an exemplary computing system.

Referring now to FIG. 6, a high-level illustration of an exemplary computing device 600 that can be used in accordance with the systems and methodologies disclosed herein is illustrated. For instance, the computing device 600 may be used in a system that simulates a GPS constellation. By way of another example, the computing device 600 can be used in a system that generates a GPS constellation signal and provides the GPS constellation signal to a GPS receiver. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store a previously initialized or current state of the GPS constellation, P/T solutions, etc.

The computing device 600 additionally includes a data store 608 that is accessible by the processor 602 by way of the system bus 606. The data store 608 may include executable instructions, PNT data, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. By way of example, aspects of functionality described herein relative to the GPS simulator component 124 can be performed by a dedicated ASIC or by a suitably configured FPGA.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a receiver configured to operate in conjunction with a satellite-based navigation system;
   a position, navigation, timing (PNT) system that outputs PNT data, the PNT data indicative of at least one of a position or a current time, the PNT system configured to operate independent of the satellite-based navigation system; and
   a computing device configured to perform the following acts:
   responsive to receiving the PNT data from the PNT system, generating a satellite constellation signal, the satellite constellation signal conforming to a navigation signal format of the satellite-based navigation system; and
   outputting the satellite constellation signal to the receiver, wherein responsive to receiving the satellite constellation signal, the receiver outputs an indication of the position or the current time indicated in the PNT data.

2. The system of claim 1, wherein the satellite-based navigation system is one of:
   the Global Positioning System (GPS);
   the Global Navigation Satellite System (GLONASS);
   the BeiDou Navigation System (BDS); or
   the Galileo satellite system.

3. The system of claim 1, wherein the receiver is a first receiver configured to operate in conjunction with a first satellite-based navigation system, wherein further the PNT system comprises a second receiver configured to operate in conjunction with a second satellite-based navigation system.

4. The system of claim 1, wherein the receiver and the PNT system are collocated on a same platform.

5. The system of claim 1, wherein the PNT system comprises a LORAN receiver.

6. The system of claim 1, wherein the PNT system determines the position based upon multilateration from signals output by a plurality of ground-based antennas.

7. The system of claim 1, wherein the computing device outputs the satellite constellation signal to the receiver by way of a wired connection.

8. The system of claim 1, wherein the receiver comprises a first antenna, the system further comprising a second antenna, wherein the computing device outputs the satellite constellation signal to the receiver by way of the second antenna and the receiver receives the satellite constellation signal by way of the first antenna.

9. The system of claim 1, wherein the receiver comprises a display, wherein the receiver outputs the indication of the position on the display.

10. The system of claim 9, wherein the receiver outputs an indication that the position is a position determined by the PNT system.

11. The system of claim 1, wherein the satellite constellation signal comprises a plurality of simulated satellite signals, each of the simulated satellite signals comprising a simulated signal output by a respective satellite.

12. A method, comprising:
   receiving data indicative of at least one of a position or a current time from a position, navigation, timing (PNT) system, the PNT system configured to operate independent of a satellite-based navigation system;

based upon the data, outputting a constellation signal to a receiver configured to operate in conjunction with the satellite-based-navigation system, the constellation signal conforming to a navigation signal format of the satellite-based navigation system, the constellation signal configured such that responsive to receipt of the constellation signal at the receiver, the receiver outputs an indication of at least one of the position or the current time.

13. The method of claim 12, wherein the PNT system comprises a multilateration-based navigational system.

14. The method of claim 13, wherein the PNT system comprises a LORAN receiver.

15. The method of claim 12, wherein the satellite-based-navigation system is a first satellite-based-navigation system, and wherein further the PNT system comprises a second receiver configured to operate in conjunction with a second satellite-based-navigation system.

16. The method of claim 12, wherein the receiver and the PNT system are mounted on a same platform.

17. The method of claim 12, wherein outputting the constellation signal to the receiver comprises outputting the constellation signal by way of a first antenna, wherein the receiver receives the constellation signal by way of a second antenna.

18. The method of claim 12, wherein outputting the constellation signal to the receiver comprises outputting the constellation signal by way of a wired connection, wherein the receiver receives the constellation signal by way of the wired connection.

19. A computer-readable storage medium comprising instructions that, when executed by a processor, cause the processor to perform the following acts:

responsive to receiving an indication of a position solution from a positioning system, the position system configured to operate independent of a global positioning system (GPS), generating a GPS constellation signal that conforms to a GPS format; and outputting the GPS constellation signal to a GPS receiver, the GPS constellation signal configured to cause the GPS receiver to output data indicative of the position solution.

20. The computer-readable storage medium of claim 19, wherein the GPS constellation signal comprises a plurality of simulated GPS signals, each of the simulated GPS signals simulating an output of a respective GPS satellite.

* * * * *